United States Patent [19]

Nakata et al.

[11] Patent Number: 4,897,586

[45] Date of Patent: Jan. 30, 1990

[54] ELECTRIC CONTROL APPARATUS FOR INDUSTRIAL ROBOT

[75] Inventors: Shuichi Nakata, Kariya; Katsumi Yamamoto, Takahama; Toshio Aono; Shinichi Sugita, both of Kariya; all of Japan;

[73] Assignee: Toyoda Koko Kabushiki Kaisha, Kariya, Japan

[21] Appl. No.: 330,488

[22] Filed: Mar. 30, 1989

[30] Foreign Application Priority Data

Mar. 30, 1988 [JP]  Japan .................................. 63-77073

[51] Int. Cl.$^4$ ............................................ G05B 19/42
[52] U.S. Cl. ................................. 318/568.1; 318/573;
318/568.16; 318/568.17; 364/513; 901/9;
901/15; 901/20
[58] Field of Search .............................. 318/560–573,
318/632; 364/513; 901/2, 9, 15, 20–24, 3

[56] References Cited

U.S. PATENT DOCUMENTS

| | | | |
|---|---|---|---|
| 4,132,937 | 1/1979 | Engelberger et al. | 364/513 X |
| 4,278,920 | 7/1981 | Ruoff, Jr. | 318/568.1 X |
| 4,308,584 | 12/1981 | Arai | 901/3 X |
| 4,408,286 | 10/1983 | Kikuchi et al. | 318/568.16 X |
| 4,467,436 | 8/1984 | Chance et al. | 364/513 |
| 4,621,331 | 11/1986 | Iwata | 364/513 |
| 4,621,332 | 11/1986 | Sugimoto et al. | 318/568.17 X |
| 4,625,285 | 11/1986 | Mori et al. | 318/568.17 X |
| 4,661,032 | 4/1987 | Arai | 364/513 |
| 4,689,756 | 8/1987 | Koyama et al. | 318/573 X |
| 4,710,884 | 12/1987 | Tokairin et al. | 364/513 |

Primary Examiner—William M. Shoop, Jr.
Assistant Examiner—Paul Ip
Attorney, Agent, or Firm—Oblon, Spivak, McClelland, Maier & Neustadt

[57] ABSTRACT

An electric control apparatus for an industrial robot the arm of which is actuated to carry out machining of a workpiece by means of a machining tool attached thereto. The control apparatus includes a force sensor arranged to detect reaction force acting on the tool, a memory for memorizing a maximum reaction force detected by the sensor during each machining process of the workpiece in a plurality of split sections of a teaching line, a comparator for comparing the memorized maximum reaction force with a set value indicative of a limit of reaction force acting on the tool and for producing a signal therefrom when the memorized maximum force exceeds the set value. The control apparatus is arranged to operate the robot in such a manner that the machining tool is moved along the teaching line to successively carry out machining of the workpiece in the split sections and is further arranged to ascertain as to whether or not the comparator produces the signal therefrom at each time when the tool arrives at each terminal point of the split sections for producing a control signal therefrom when applied with the signal from the comparator, thereby operating the robot in response to the control signal in such a manner that the machining tool is returned to each start point of the slipt sections to repeat deburring in the same section.

4 Claims, 5 Drawing Sheets

ELECTRIC CONTROL APPARATUS FOR INDUSTRIAL ROBOT

BACKGROUND OF THE INVENTION

1. Field of the Invention

The present invention relates to an electric control apparatus for an industrial robot the arm of which is actuated to carry out machining of a workpiece by means of a machining tool attached thereto.

2. Description of the Prior Art

An electric control apparatus for an industrial robot of this kind includes memory means for memorizing a plurality of teaching points representing the contour of a workpiece to be machined and execution means for operating the robot in such a manner that a machining tool attached to the robot's arm is moved along a teaching line defined by the teaching points to remove burrs from the workpiece or to polish the workpiece. In the case that an end milling tool is attached to the robot's arm to remove burrs from the workpiece, there will occur relative displacement between the tool and the workpiece due to machining reaction force acting on the robot, the workpiece support and the like. Since the machining reaction force varies with greatness in size or extent of burrs, the actual machining line will differ from the teaching line, resulting in an increase of unremoved burrs on the workpiece. For the purpose of reducing such unremoved burrs, it has been considered to detect a load acting on a servomotor of the tool for decreasing the moving speed of the tool in accordance with an increase of the load and for increasing the moving speed of the tool in accordance with a decrease of the load. In such control of the tool, it is impossible to remove partly remained burrs from the workpiece due to a delay of time in operation of the load detector and in a control system of the robot.

SUMMARY OF THE INVENTION

It is, therefore, a primary object of the present invention to provide an electric control apparatus for the robot which is capable of removing partly remained burrs from the workpiece.

According to the present invention, the object is attained by providing an electric control apparatus for an industrial robot the arm of which is actuated to carry out machining of a workpiece by means of a machining tool attached thereto. The control apparatus includes a force sensor arranged to detect reaction force acting on the machining tool, first memory means for memorizing a plurality of teaching points representing the contour of the workpiece to be machined, second memory means for memorizing a maximum reaction force detected by the force sensor during each machining process of the workpiece in a plurality of split sections of a teaching line defined by the teaching points, setting means for setting a value indicative of a limit of reaction force acting on the machining tool, comparison means for comparing the memorized maximum reaction force with the set value and for producing a signal therefrom when the memorized maximum reaction force exceeds the set value, control means for ascertaining as to whether or not the comparison means produces the signal therefrom at each time when the machining tool arrives to each terminal point of the split sections and for producing a control signal therefrom when applied with the signal from the comparison means, and execution means for operating the robot in such a manner that the machining tool is moved along the teaching line to successively carry out machining of the workpiece in the split sections and for operating the robot in response to the control signal from the control means in such a manner that the machining tool is once moved away from the workpiece and returned to each start point of the split sections to repeat machining in the same section.

BRIEF DESCRIPTION OF THE DRAWINGS

Additional objects, features and advantages of the present invention will be readily appreciated from the following detailed description of a preferred embodiment thereof when considered with reference to the accompanying drawings, in which.

DESCRIPTION OF THE PREFERRED EMBODIMENT

Figure 1:
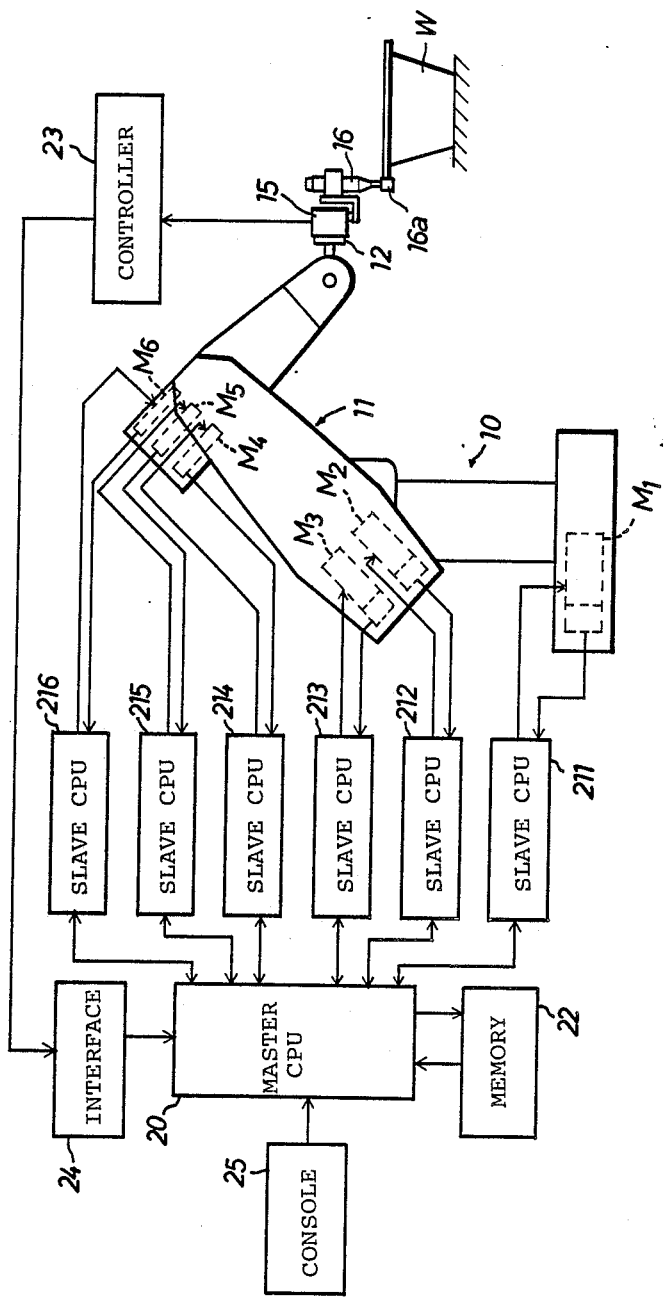
FIG. 1 is a schematic illustration of an industrial robot to be operated under control of an electric control apparatus in accordance with the present invention.
Figure 2:
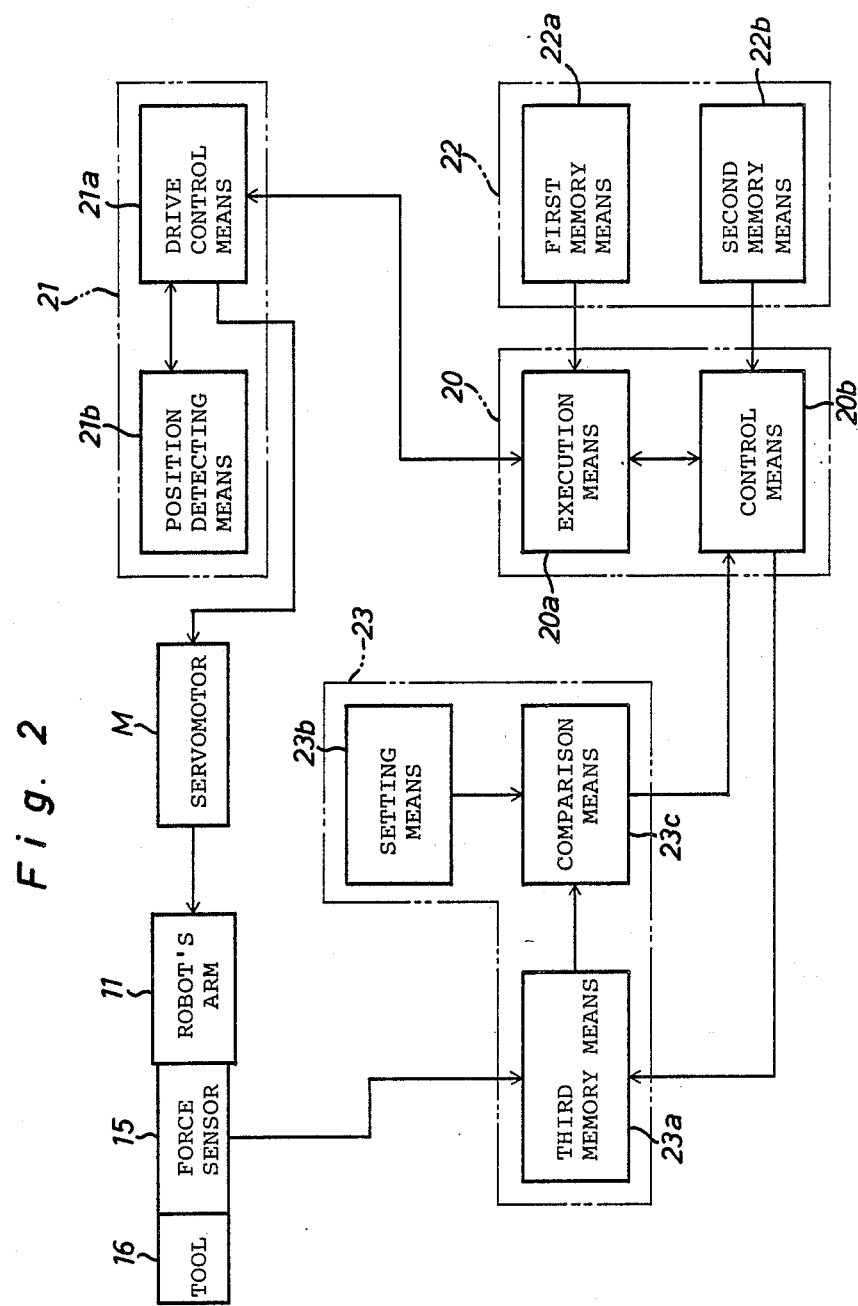
FIG. 2 is a block diagram of the electric control apparatus shown in FIG. 1.

Disclosed in FIG. 1 of the drawings is an industrial robot 10 of the multi-articulated six-spindle type which has tiltable arms 11 pivoted in sequence to one another and a wrist part 12 connected to the arms 11 to carry an electrically operated machining tool 16 attached thereto through a force sensor 15. The machining tool 16 has a rotary shaft provided with a machining part 16a such as an end mill for deburring. The respective tiltable arms 11 and wrist part 12 are arranged to be actuated by six servomotors $M_1$–$M_6$. An electric control apparatus for the robot 10 includes a master central processing unit 20 (hereafter called M-CPU) connected to a memory 22. The M-CPU 20 is connected to the respective servomotors $M_1$–$M_6$ through slave central processing units 211–216 (hereafter called S-CPU). The M-CPU 20 is further connected to the force sensor 15 through a controller 23 and an interface 24 and to a console 25. In FIG. 2, the slave central processing units 211–216 are simply represented by the reference numeral 21, and the servomotors $M_1$–$M_6$ are simply represented by the reference numeral M.

The slave central processing units 211–216 each include drive control means 21a and position detecting means 21b. The drive control means 21a is programmed to distribute a control pulse therefrom to the respective servomotors $M_1$–$M_6$ in response to a command signal from the M-CPU 20. The position detecting means 21b is programmed to count the control pulse distributed thereto from the drive control means 21a thereby to detect the actual position of machining tool 16. The memory 22 includes first memory means 22a for memorizing a plurality of teaching points defining a predetermined teaching line T and second memory means 22b for memorizing a plurality of split points dividing the teaching line into a plurality of split sections. In this embodiment, the split points are determined to coincide with the teaching points. Alternatively, the split points may be defined by interpolation points calculated by the M-CPU 20 on a basis of the teaching points as will be described later.

As shown in FIG. 2, the sensor controller 23 includes third memory means 23a for memorizing a maximum machining reaction force acting on the tool 16, setting means 23b for setting a value $F_1$ indicative of a limit of the machining reaction force, and comparison means 23c for comparing a value $F_2$ indicative of the memorized maximum reaction force with the set value $F_1$ and for producing an instruction signal therefrom when the value $F_2$ exceeds the set value $F_1$. In this embodiment, the value $F_1$ is determined to correspond with a reaction force acting on the machining tool 16 when it has been deviated from a permissible line D spaced from the teaching line T with a permissible value $\delta_1$ of unremoved burrs.

As shown in FIG. 2, the M-CPU includes execution means 20a programmed to calculate a plurality of interpolation points between the respective teaching points memorized in the first memory means 22a and to operate the robot 10 in such a manner that the machining part 16a of tool 16 is moved along the teaching line T to successively carry out deburring in the respective sections. The execution means 20a is further programmed to operate the robot 10 in response to a control signal applied thereto from control means 20b in such a manner that the machining part 16a of tool 16 is once moved away from the workpiece and returned to each start point of the respective sections to repeat deburring in the same section. To operate the robot 10 under such control of the execution means 20a, the control means 20b is programmed to ascertain as to whether or not the comparison means 23c produces an instruction signal therefrom at each time when the machining part 16a of tool 16 arrives at a terminal point of the respective sections and to reset the memorized value $F_2$ in third memory means 23a after ascertainment of the instruction signal from comparison means 23c.

When applied with the instruction signal from comparison means 23c, the control means 20b produces the control signal therefrom to operate the robot 10 under control of the execution means 20a in such a way as to repeat deburring in the same section as described above. If not applied with any instruction signal from comparison means 23c, the control means 20 does not produce any control signal therefrom, and the robot 10 is operated under control of the execution means 20b to subsequently carry out deburring in the following section. In a practical embodiment, the comparison means 23c may be arranged to be directly applied with a signal indicative of machining reaction force from the force sensor 15. In such an arrangement, the comparison means 23c is designed to memorize the fact that the machining reaction force has exceeded the set value $F_1$, and the control means 20b is designed to eliminate the memorized fact in comparison means 23c.

Figure 3:
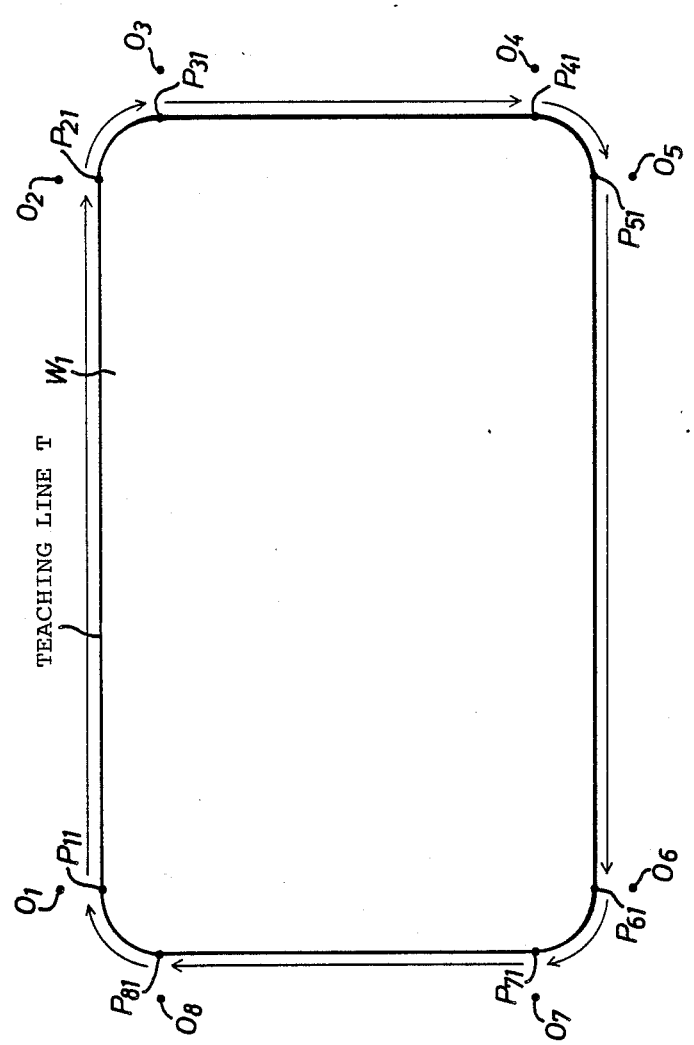
FIG. 3 is a view illustrating deburring process of a workpiece.
Figure 4:
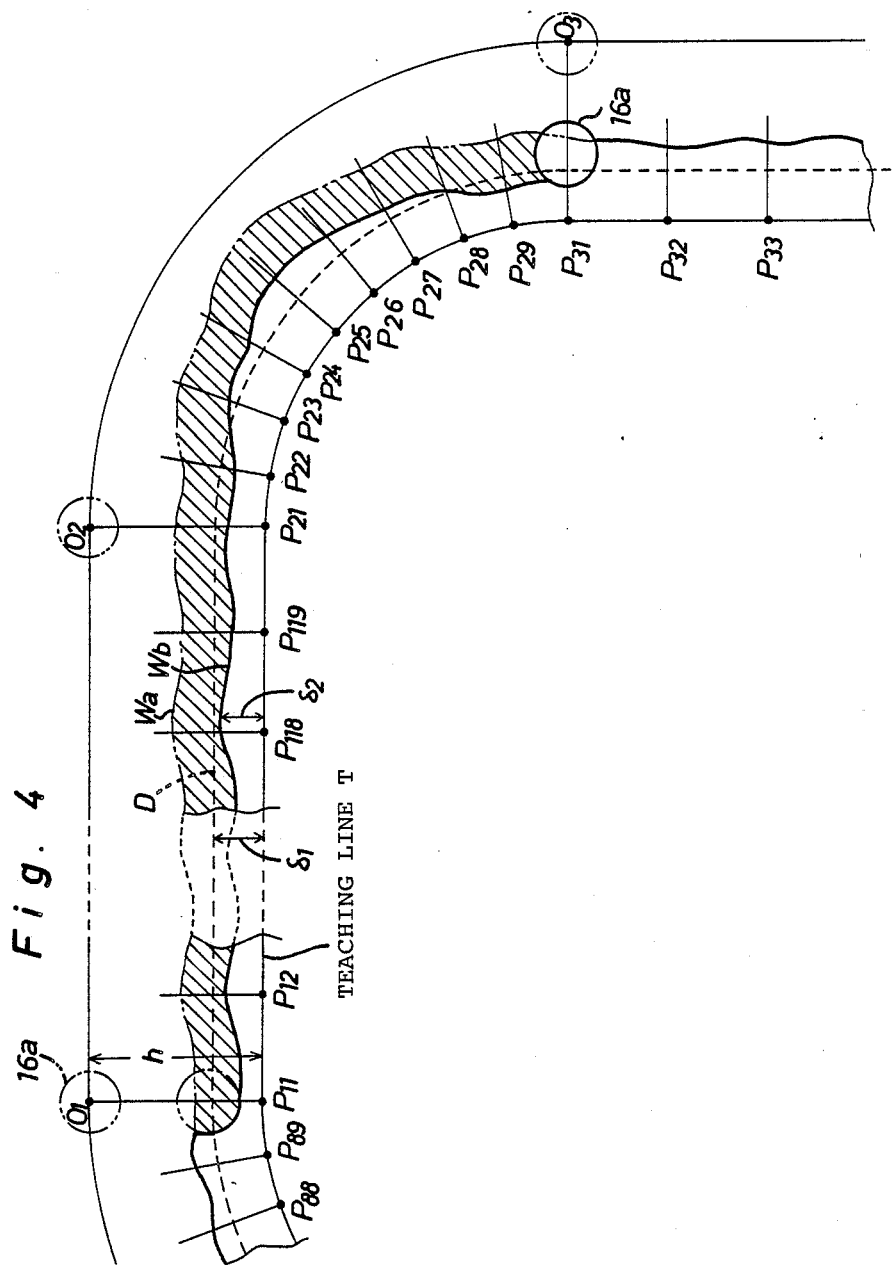
FIG. 4 is a view illustrating in detail the deburring process.

Assuming that the robot 10 is operated under control of the M-CPU to remove burrs from a model workpiece $W_1$ as shown in FIG. 3, eight teaching points $P_{11}$ to $P_{81}$ on the outer circumference of workpiece $W_1$ are determined and memorized in the first memory means 22a. In this embodiment, the eight teaching points $P_{11}$ to $P_{81}$ are also memorized as split points in the second memory means 22b, and a teaching line T is divided into eight sections $\overline{P_{11}P_{21}}$-$\overline{P_{81}P_{11}}$ which are each provided therein with a plurality of interpolation points. For example, as shown in FIG. 4, eighteen interpolation points $P_{12}$ to $P_{119}$ are provided in the first section between points $P_{11}$ and $P_{21}$, and eight interpolation points $P_{22}$ to $P_{29}$ are provided in the second section between points $P_{21}$ and $P_{31}$. The execution means 20a is programmed to calculate the interpolation points on a basis of the teaching points $P_{11}$ to $P_{81}$ previously memorized in the first memory means 22a.

Figure 5:
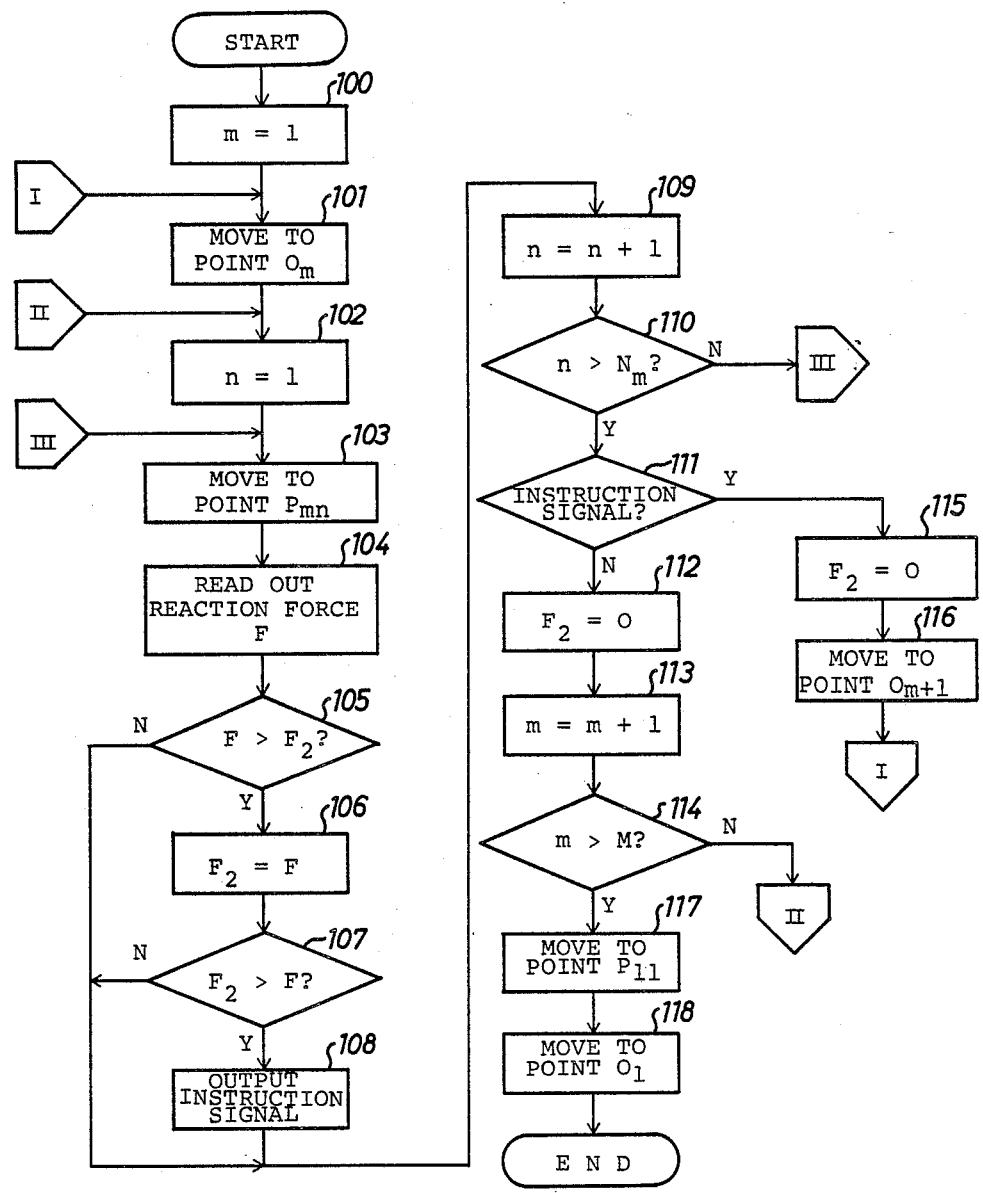
FIG. 5 is a flow chart to be executed by a master central processing unit of the control apparatus shown in FIGS. 1 and 2.

Hereinafter, the deburring operation of the workpiece $W_1$ will be described with reference to a flow chart shown in FIG. 5. After the workpiece $W_1$ has been positioned in place on a support, the console 25 is operated to apply a start command signal to the M-CPU so as to drive the machining tool 16 under control of the robot 10. At step 100 in the flow chart, a first count value $m=1$ is set by the M-CPU to carry out deburring in the first section between points $P_{11}$ and $P_{21}$. At the following step 101, the servomotors $M_1$-$M_6$ of robot 10 are activated under control of the M-CPU to move the machining part 16a of tool 16 to a position $O_1$ spaced at point $P_{11}$ in a distance h from the teaching line T. The distance h is determined to avoid abutment of the machining part 16a with the outer circumference Wa of burrs on the workpiece W. At the following step 102, the M-CPU sets a second count value $n=1$ and causes the program to proceed to step 103 where the robot 10 is operated under control of the M-CPU to move the machining part 16a of tool 16 toward the first teaching point $P_{11}$ for removing burrs from the workpiece $W_1$. In this instance, the machining part 16a of tool 16 does not necessarily arrive at the teaching point $P_{11}$ due to reaction force acting thereon. At step 104, the reaction force F acting on the machining part 16a of tool 16 is detected by the force sensor 15 and read out by the third memory means 23a of controller 23. At the following step 105, the reaction force F is compared with an initial value $F_2=0$ in the third memory means 23a. As the reaction force F is larger than the initial value $F_2$, the program proceeds to step 106 where the reaction force F is memorized as a maximum value $F_2$ in the third memory means 23a.

When the program proceeds to step 107, the comparison means 23c of controller 23 determines as to whether the memorized maximum value $F_2$ is larger than a set value $F_1$ previously memorized in the setting means 23b. If the answer is "No", the program proceeds to step 109 where the M-CPU renews the second count value to "2" by increment of "1" thereto. If the answer is "Yes", the program proceeds to step 108 where the comparison means 23c produces an instruction signal therefrom. When the program proceeds to step 110, the M-CPU determines as to whether or not the second count value n is larger than the number of interpolation points Nm ($N_1=18$) in the first section $\overline{P_{11}P_{21}}$. Until the machining part 16a of tool 16 arrives at a terminal point (the last interpolation point $P_{119}$ of the first section $\overline{P_{11}P_{21}}$, the M-CPU will determine a "No" answer at step 110 to repeat the foregoing execution of the program at steps 103 to 110. During the execution of the program at steps 103 to 110, the third memory means 23a of controller 23 memorizes a maximum value $F_2$ of reaction force acting on the machining part 16a of tool 16 during deburring process in the first section, and the comparison means 23c of controller 23 will produce an instruction signal therefrom at step 108 if the maximum value $F_2$ of reaction force becomes in excess of the set value $F_1$ previously memorized in the setting means 23b.

During the deburring process in the first section $\overline{P_{11}P_{21}}$ shown in FIG. 4, the comparison means 23c of controller 23 will not produce any instruction signal therefrom since a maximum displacement $\delta_2$ of the actual machining line $W_b$ with respect to the teaching line T is maintained less than a permissible value $\delta_1$. When the machining part 16a of tool 16 arrives at the terminal point of the first section, the M-CPU determines a "Yes" answer at step 110, causing the program to proceed to the following step 111. In this instance the M-CPU determines a "No" answer at step 111, causing the program to proceed to step 112. Thus, the M-CPU resets the memorized maximum value $F_2$ to zero at step 112 and renews the first count value m to "2" by increment of "1" thereto at step 113. Subsequently, the M-CPU determines at step 114 as to whether or not the first count value m is larger than the number of split points M (=8). As the count value m is still less than the number of split points M, the M-CPU determines a "No" answer at step 114, causing the program to proceed to step 102. As a result, deburring process in the second section $\overline{P_{21}P_{31}}$ is carried out by machining part 16a of tool 16.

During the deburring process in the second section, the M-CPU will repeat the foregoing execution of the program at steps 103 to 110 until the machining part 16a of tool 16 arrives at the interpolation point $P_{22}$. When the machining part 16a of tool 16 arrives at the following interpolation point $P_{23}$, the displacement $\delta_2$ of actual machining line $W_b$ becomes larger than the permissible value $\delta_1$. In this instance, the comparison means 23c of controller 23 produces an instruction signal therefrom at step 108 and applies it to the control means 20b of M-CPU. Subsequently, the M-CPU will repeat the execution of the program at steps 103 to 110 to carry out deburring in the second section $\overline{P_{21}P_{31}}$. During such execution of the program the control means 20b of M-CPU is being applied with the instruction signal from the comparison means 23c since the previously memorized maximum value $F_2$ is maintained in excess of the set value $F_1$. Thus, the M-CPU determines a "Yes" answer at step 111 when the machining part 16a of tool 16 has arrived at the split point $P_{31}$ as shown in FIG. 4. Subsequently, the M-CPU resets the memorized maximum value $F_2$ to zero at step 115 and operates the robot 10 at step 116 in such a manner that the machining part 16a of tool 16 is once moved away from the workpiece $W_1$ and returned to a position $O_3$ spaced at point $P_{31}$ in the distance h from the teaching line T.

When the program returns to step 101, the M-CPU operates the robot 10 in such a manner that the machining part 16a of tool 16 is returned from the position $O_3$ to a position $O_2$ spaced at point $P_{21}$ in the distance h from the teaching line T. Thereafter, the M-CPU will repeat the execution of the program at steps 102 to 110 to repeat again the deburring process in the second section $\overline{P_{21}P_{31}}$. This is effective to render the maximum displacement $\delta_2$ of actual machining line $W_b$ in the second section less than the permissible value $\delta_1$. After arrival of the machining part 16a of tool 16 at a terminal point $P_{29}$ of the second section, the M-CPU causes the program to proceed to step 102 through steps 112–114. Thus, the foregoing execution of the program will be repeated to successively carry out deburring in the following section $\overline{P_{11}P_{41}}$ to $\overline{P_{81}P_{11}}$.

If during the deburring process in the following sections the maximum displacement $\delta_2$ of the actual machine line $W_b$ becomes in excess of the permissible value $\delta_1$, the execution of the program at steps 115 to 101 will be conducted under control of the M-CPU. When the machining part 16a of tool 16 has arrived at a terminal point $P_{89}$ of the eighth section between points $P_{81}$ and $P_{11}$, the M-CPU will renew the first count m to "9" by increment of "1" at step 113 if not any intruction signal from the comparison means 23c of controller 23. Subsequently, the M-CPU determines a "Yes" answer at step 114 and causes the program to proceed to step 117 where the machining part 16a of tool 16 is moved to the first teaching point $P_{11}$ under control of the M-CPU. Finally, the machining part 16a of tool 16 is returned to the position $O_1$ at step 118 under control of the M-CPU.

From the above description, it will be understood that if in operation of the robot 10 the actual machining line $W_b$ deviates from the permissible line D in the respective sections of teaching line T, deburring in the following section will be carried out after deburring in the preceding section has been repeated to remove partly remained burrs on the workpiece.

In a practical embodiment of the present invention, the split points may be determined to correspond with the teaching points. In such an arrangement, the first memory means 22a can be designed in common with the second memory means 22b.

While the invention has been described with reference to a specific embodiment, modifications and variations of the invention may be practiced without departing from the scope of the appended claims.

What is claimed is:

1. An electric control apparatus for an industrial robot the arm of which is actuated to carry out machining of a workpiece by means of a machining tool attached thereto, comprising:

memory means for memorizing a plurality of teaching points representing the contour of said workpiece to be machined; and execution means for operating said robot such that said machining tool is moved along a teaching line defined by the teaching points to carry out machining of said workpiece;

wherein the electric control apparatus further comprises:

a force sensor connected to detect reaction force acting on said machining tool;

second memory means for memorizing a maximum reaction force detected by said force sensor during each machining process of said workpiece in a plurality of split sections of the teaching line;

setting means for setting a value indicative of a limit of reaction force acting on said machining tool;

comparison means for comparing the memorized maximum reaction force with the set value and for producing an instruction signal therefrom when the memorized maximum reaction force exceeds the set value; and control means for ascertaining as to whether or not said comparison means produces the instruction signal therefrom at each time when said machining tool arrives at each terminal point of the split sections and for producing a control signal therefrom when applied with the instruction signal from said comparison means; and wherein said execution means is connected to operate said robot in response to the control signal from said control means such that said machining tool is once moved away from said workpiece and returned to each start point of the split sections to repeat machining in the same section.

2. An electric control apparatus for an industrial robot the arm of which is actuated to carry out machining of a workpiece by means of a machining tool attached thereto, comprising:

memory means for memorizing a plurality of teaching points representing the contour of said workpiece to be machined; and execution means for operating said robot such that said machining tool is moved along a teaching line defined by the teaching points to carry out machining of said workpiece;

wherein the electric control apparatus further comprises:

a force sensor connected to detect reaction force acting on said machining tool;

second memory means for memorizing a plurality of split points dividing the teaching line into a plurality of split sections;

third memory means for memorizing a maximum reaction force detected by said force sensor during each machining process of said workpiece in the split sections of the teaching line;

setting means for setting a value indicative of a limit of reaction force acting on said machining tool;

comparison means for comparing the memorized maximum reaction force with the set value and for producing an instruction signal therefrom when the memorized maximum reaction force exceeds the set value;

control means for ascertaining as to whether or not said comparison means produces the instruction signal therefrom at each time when said machining tool arrives at each terminal point of the split sections and for producing a control signal therefrom when applied with the instruction signal from said comparison means; and wherein said execution means is connected to operate said robot in response to the control signal from said control means such that said machining tool is once moved away from said workpiece and returned to each start point of the split sections to repeat machining in the same section.

3. An electric control apparatus as recited in claim 2, wherein said execution means is connected to calculate a plurality of interpolation points between the respective teaching points thereby to operate said robot such that said machining tool is moved along a teaching line defined by the calculated interpolation points.

4. An electric control apparatus as recited in claim 2, wherein said machining tool is adopted to remove burrs from said workpiece.

* * * * *

UNITED STATES PATENT AND TRADEMARK OFFICE
CERTIFICATE OF CORRECTION

PATENT NO. : 4,897,586
DATED : Jan. 30, 1990
INVENTOR(S) : Shuichi Nakata, et al It is certified that error appears in the above-identified patent and that said Letters Patent is hereby corrected as shown below:

Title page:

The Assignee is incorrect "Toyoda Koko Kabushiki Kaisha" should read:

--Toyoda Koki Kabushiki Kaisha--

Signed and Sealed this

Twenty-fifth Day of June, 1991

Attest:

HARRY F. MANBECK, JR.

*Attesting Officer*  *Commissioner of Patents and Trademarks*